A. E. NIGHTINGALE.
FURROW OPENER OR DRILL TOOTH.
APPLICATION FILED DEC. 19, 1921.
1,431,247.
Patented Oct. 10, 1922.
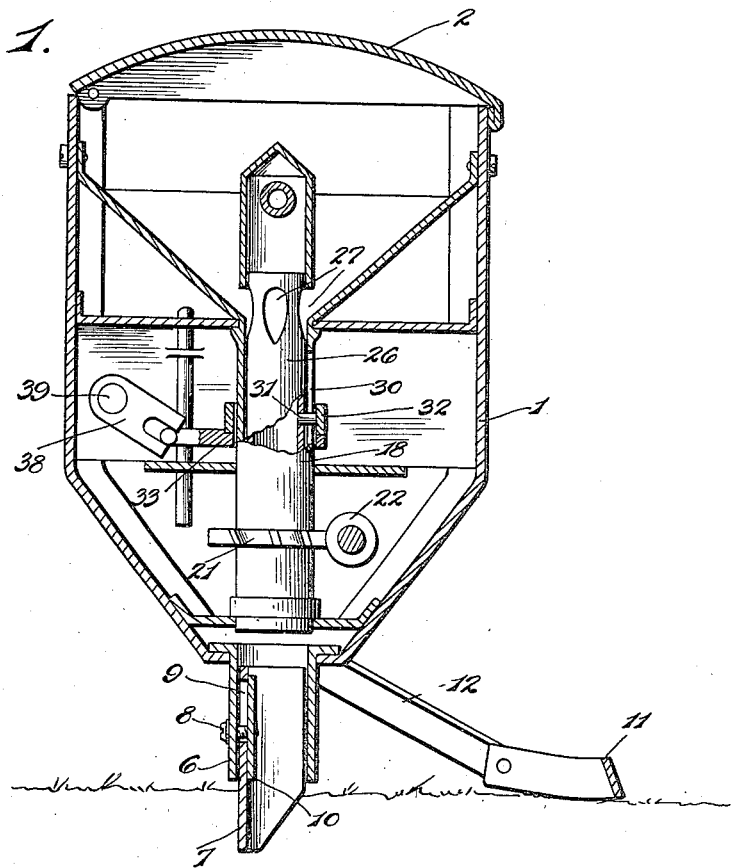
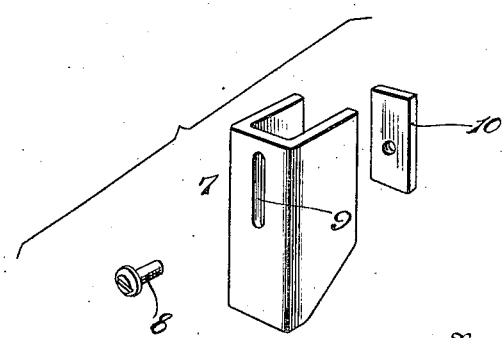
Inventor
A. E. Nightingale
By Lacey & Lacey, Attorneys Patented Oct. 10, 1922.

1,431,247

UNITED STATES PATENT OFFICE.

ALVIN E. NIGHTINGALE, OF CEDARVILLE, MASSACHUSETTS.

FURROW OPENER OR DRILL TOOTH.

Original application filed July 20, 1921, Serial No. 486,135. Divided and this application filed December 19, 1921. Serial No. 523,380.

*To all whom it may concern:*

Be it known that I, ALVIN E. NIGHTINGALE, a citizen of the United States, residing at Cedarville, in the county of Plymouth and State of Massachusetts, have invented certain new and useful Improvements in Furrow Openers or Drill Teeth, of which the following is a specification.

This invention relates to drill teeth or furrow-openers for use upon seed planters, the present application being a division of an application filed by me July 20, 1921, Serial No. 486,135.

In the accompanying drawing,

Figure 1 is a vertical longitudinal section of the seed-dispensing mechanism of a planter embodying my present invention;

Fig. 2 is a detail perspective of the drill tooth.

The container 1 may be supported in any desired manner and is provided with a swinging cover 2 to protect the seed and to facilitate the feeding of the same into the container.

Depending from the lower end of the container is a discharge spout 6 and fitted within said spout is a furrow opener 7 which depends through the open lower end of the spout and is adjustably held therein by a set screw or bolt 8 fitted through the front wall of the spout and through a vertical slot 9 in the front wall of the furrow opener, a nut or holding plate 10 being fitted upon the inner end of the said set screw or bolt and held against turning by the engagement of its side edges with the flat sides of the furrow opener, as will be readily understood. By loosening the set screw or bolt, the furrow opener may be adjusted vertically so as to project to a greater or less extent below the spout and, therefore, form a furrow in the ground of the proper depth for the planting of the particular seed which may be within the container. I also employ an evener consisting of a bar 11 presented edgewise to the surface of the ground and carried by arms 12 which are pivotally mounted upon the sides of the container so that the evener may be adjusted pivotally and thereby set to act upon the surface of the ground and deposit the loose soil at the sides of the furrow over the planted seed. The arms 12 extend rearwardly and downwardly from the container, and I provide means at the upper end of either or both arms to hold the same in a set position.

It will, of course, be understood from the drawing that the spout 6 is flat-sided and the furrow opener 7 fits closely therein so that it can move only in a rectilinear vertical path, and when the bolt 8 is turned home the plate 10 is drawn firmly against the front wall of the furrow-opener so as to clamp the latter securely in place. The plate 10 also covers the slot 9 so that seed cannot collect therein.

Within the container is a feeding tube 18, rotatable through worm gearing indicated at 21 and 22. An inner tube 26 projects above the tube 18 and is provided with openings 27 near its upper end to permit seed to enter the tube. The tube 18 is constructed with a vertical slot 30 which receives a pin 31 projecting from the inner tube and fixed to a collar 32 encircling the outer tube. A lifting ring or yoke 33 supports the collar and is controlled by the crank 38 on a rock shaft 39 so that, while the two tubes may rotate freely under the influence of the worm gearing to agitate and feed the seed, the inner tube may be adjusted vertically so that more or less of the openings 27 will be exposed to the hopper according to the size or quantity of seed to be fed.

The seed will, of course, be deposited in the furrow formed by the opener 7 and the loose dirt will be turned back over the seed by the coverer 11.

Having thus described the invention, what is claimed as new is:

A seed drill comprising a container, a discharge spout depending from the lower end of the container, a furrow opener fitted in and depending from said discharge spout and provided with a vertical slot in its front wall, a set bolt mounted in the front wall of the discharge spout, and a nut mounted upon the inner end of the set bolt and held against turning by engagement with the sides of the furrow opener.

In testimony whereof I affix my signature.

ALVIN E. NIGHTINGALE. [L. S.]